United States Patent Office 2,865,978
Patented Dec. 23, 1958

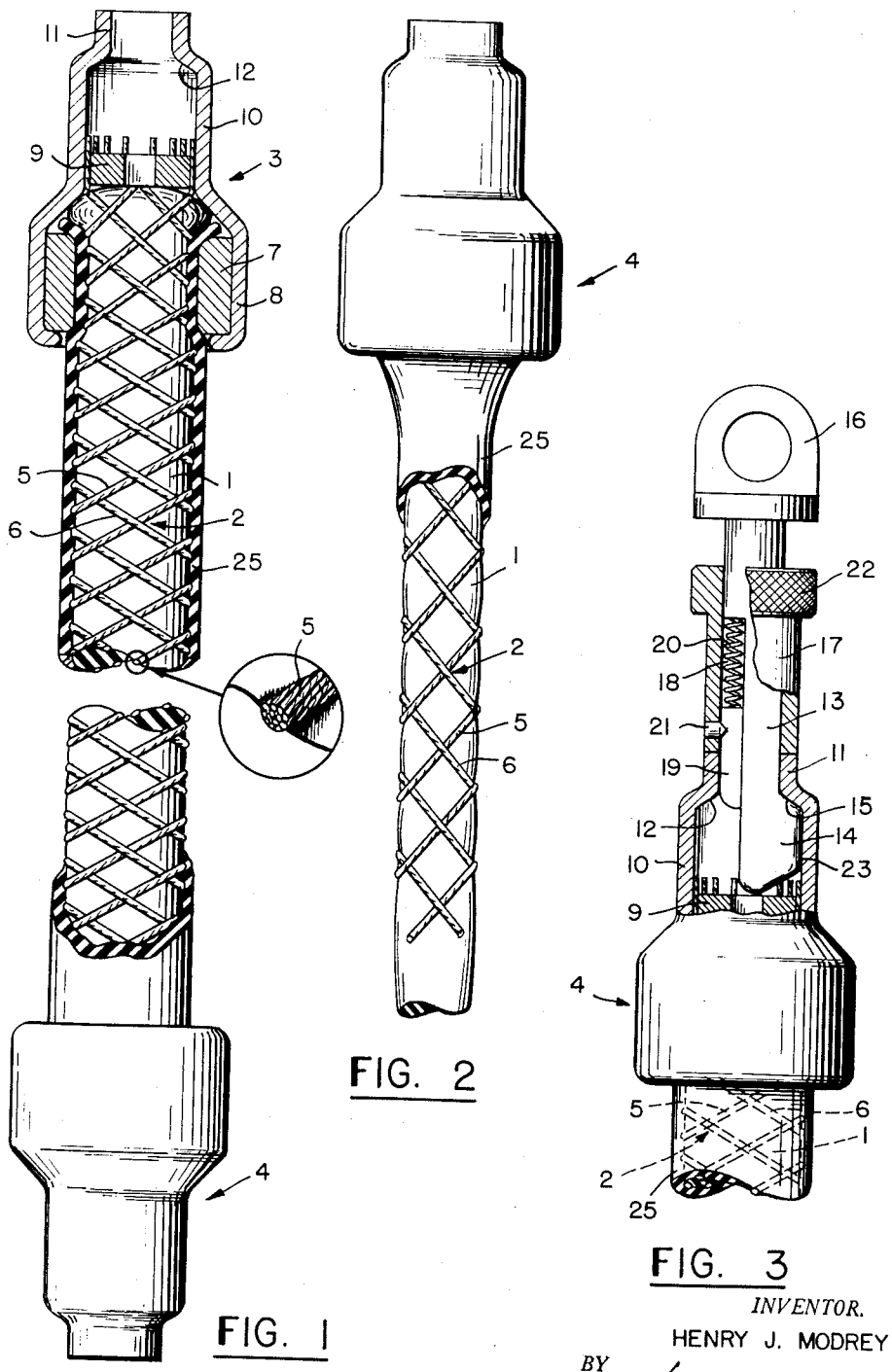

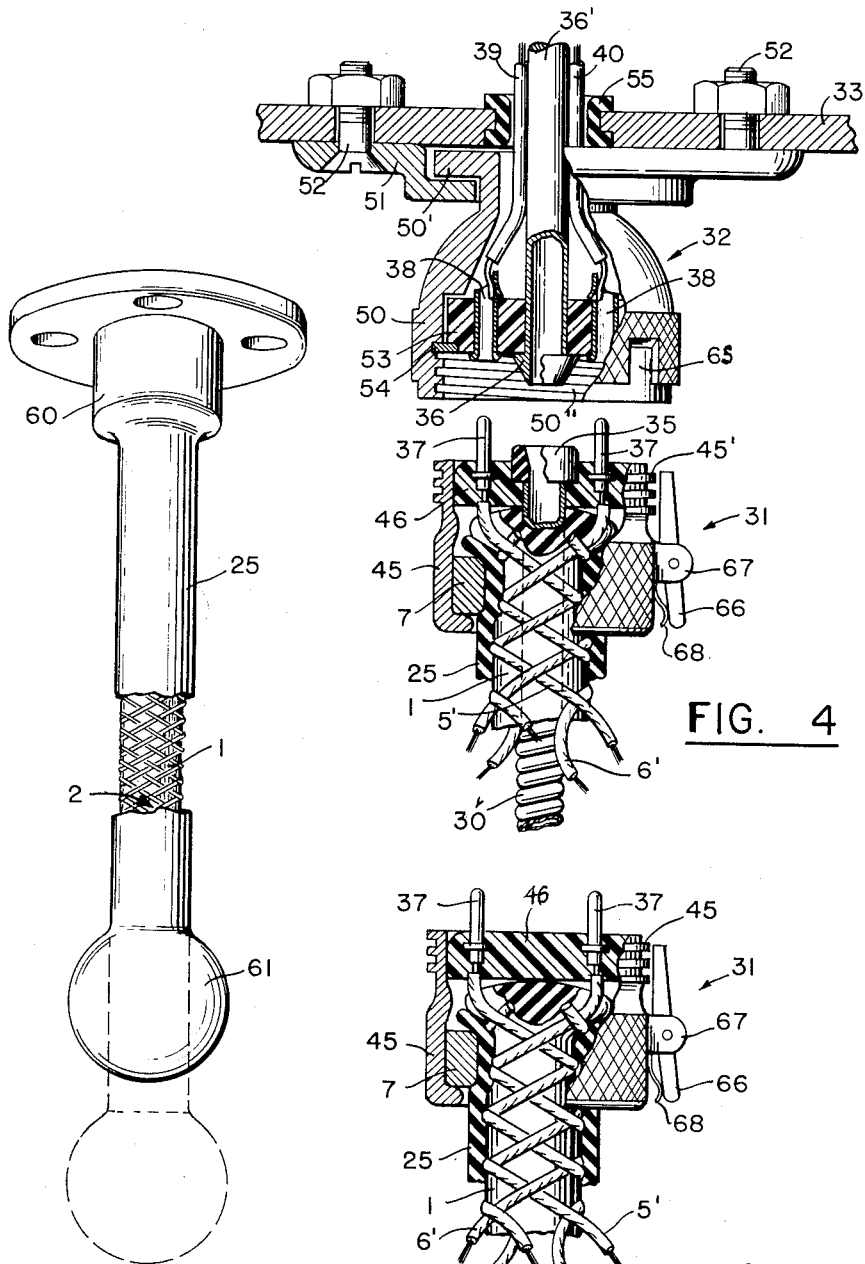

2,865,978

ELASTIC ROPES AND CABLES

Henry J. Modrey, Stamford, Conn., assignor of two-thirds to Bernard E. Smith, New York, N. Y.

Application August 26, 1954, Serial No. 452,271

4 Claims. (Cl. 174—69)

The present invention relates to ropes, mechanical and electric cables designed to sustain a generally axial pull load. Among the preferred fields of application of the invention are tow ropes for towing vehicles or marine vessels, and mechanical and electric cables subjected to rough handling when in use, such as cables used in mining equipment, ship to ship or ship to shore and other marine cables, cables used with cranes, elevators, hoists, mine sweeping and paravane equipment etc.

Ropes and cables of the general kind above referred to, should act to a certain extent as shock absorbers to take up gradually the load and to smooth out or absorb jerks to which they may be subjected.

Various attempts have been made to design ropes and cables serving the above referred to purposes. There are known ropes made of rubber. However, rubber is inherently not very suitable for the type of pull load here involved. It stretches easily beyond its elastic limit which may result in a rupture of the rope. If a rope is made solid enough to take the required maximum load including jerks, it becomes so thick when designed for heavy loads, that its shock absorbing elasticity is substantially lost.

Attempts to reinforce a rubber rope by a molded-in spiral spring have failed as such spring tends to uncoil and to take a permanent elongation when stretched beyond its elastic limit.

There are also known limit devices in form of external attachments which limit the possible maximum elongation of a rubber rope. Such devices are so set that they will take up the load and become a fixed coupling before the permissible maximum elongation of the rubber is reached. Limit devices of this type comprise steel cables and/or rods the length of which is determined by the permissible elongation of the rope. If rods are used, they must be able to slide during the elongation of the rubber and if wires are used space must be provided for the slack which is gradually taken up by the stretching of the rubber rope. Devices of this type are expensive and unreliable. Rods tend to bend and buckle in their guides, especially when they are subjected to changes in the direction of the load which occur for instance, when a trailer is pulled through a road curve. Wires when slack have a tendency to snag.

While as previously explained, the heretofore known rubber ropes have several serious disadvantages, rubber as rope material has also highly desirable properties.

Accordingly, the basic object of the invention is to provide a novel and improved rope made of rubber, a rubber composition or other elastically stretchable material such as a suitable plastic, which makes use of all the desirable properties of such elastically stretchable material while neutralizing or rendering harmless the disadvantageous properties thereof.

Another object of the invention is to provide a novel and improved rope design, the elongation of which is limited by means which in contrast to the heretofore known limit devices constitute an integral part of the rope and are hence not subject to the aforedescribed disadvantages of the known external devices. Another advantage of limiting means integrated with the rope is that such limit means permit to retain the usual generally cylindrical configuration of the rope as the limit means are substantially within the cylindrical outline of the rope. The absence of components radially protruding from the rope assembly, as do the heretofore known limit devices, obviates the danger of injuries to service personnel and of damage to the rope assembly proper. Finally the general appearance of the rope assembly is greatly improved by avoidance of protrusions formed by the rods or wires of conventional limit devices.

A further and basic object of the invention is to provide a rope or cable design which at least partially converts an axial pull load applied thereto into a compression load for which the elastically stretchable material is eminently suitable.

A more specific object of the invention, allied with the preceding one, is to provide a rope design in which any jerk applied to the rope or cable, after the same has experienced an initial limited elongation, is converted into a generally radially directed pressure distributed over substantially the entire length of the rope or cable whereby the same acts as a shock absorber effectively cushioning jerks applied to the rope.

Still another object of the invention is to provide a novel and improved rope or cable design in which the load carrying component of the rope which is constituted by the elastically stretchable rubber or other material is combined with a second load carrying component in form of a wire mesh harness which participates in the take up of the load and limits its resulting own elongation and that of the rubber or other material to a predetermined maximum length.

A still further object of the invention is to provide a novel and improved rope design in which an axial pull load applied to the rope is gradually taken up first by the stretchable rubber or other material only, which as a result experiences a certain initial elongation and then, as the load increases by the said material and the aforementioned second load carrying component jointly until both, the core material and the second load carrying component have reached a predetermined elongation whereupon the second component converts the axial pull load continuing to act upon the rope into a radially directed compression force. As a result, the possible total elongation of the rope is limited to the aforesaid predetermined elongation which can be conveniently selected within the acceptable range of elongation of the rubber or other material and the second load carrying component. Any additional axial pull load caused for instance, by jerks, merely results in a corresponding increase in the radial compression force acting upon the rubber or other material, a force as previously mentioned the said material is eminently capable of withstanding.

A still further object of the invention is to provide a rope design which permits manufacture of the rope in continuous length thereby greatly simplifying the manufacturing operation and reducing the costs thereof.

Still another object of the invention is to provide a rope or cable incorporating a fluid duct for instance, for an air brake connection between a towing vehicle and a towed vehicle and/or incorporating electric conductors for establishing a circuit connection between a towing vehicle or vessel and a towed vehicle or vessel.

A more specific object of the invention, allied with the next preceding one, is to provide a rope or cable including a fluid duct, the elongation and radial contraction of which are so correlated that the duct is not unduly constricted when the rope or cable reaches its maximum elongation as controlled by the aforementioned harness.

Another more specific object of the invention is to provide an electric cable, the harness of which is formed by electrically insulated wires constituting the conductors of the cable. By reason of the aforedescribed elongation limiting properties of the harness as to its own elongation and the elongation of the core material enveloped by it, in response to an axial pull, the harness effectively prevents an over-stressing of the wires. In other words, the harness serves as a safety means for the electrical connection formed by it, by converting the axial pull load into a radial compression load before the pull on the wires reaches a critical value.

As appears from the previous description, the rope or cable may incorporate a fluid duct and electrical connections in which event the elongation limiting features of the harness will safeguard both, the cross-sectional area of the duct and the electrical connections.

A further object of the invention is to provide a rope or cable assembly which permits to hook up and to disconnect the aforesaid fluid connections and electric connections by means of a single device and by a single operation.

Still another object of the invention is to encase the core material and the harness enveloping same in a protective hose made of rubber or a suitable plastic. This protective hose protects the wire mesh and permits also to apply a lubrication such as graphite between the hose and the rope proper to reduce friction between the rope and the wire mesh enveloping the same.

As appears from the previous description and will be further explained hereinafter, the basic concept of the invention resides in a gradual take-up of the full load which may be either a steady pull load or a jerky load, by applying the load first to the core material only as axial pull load, then jointly to the second load carrying component and the core material proper as an axial pull load, and finally to the core material as a generally radial compression load, the said triple load distribution becoming effective when the maximum load is approached.

Such triple sharing of the load creates load conditions which are greatly superior to the load conditions that are obtainable for rubber ropes with or without limiting devices as heretofore known. Ropes or cables according to the invention are effectively protected against rupture, have a long lifetime, are capable of absorbing frequent and strong jerks and do not tend to snag.

Other further objects, features and advantages of the invention will be pointed out hereinafter and set forth in the appended claims forming part of the application.

In the accompanying drawing several preferred embodiments of the invention are shown by way of illustration and not by way of limitation.

In the drawing:

Fig. 1 is a view, partly in section, of a tow rope according to the invention, the rope being shown in its relaxed condition.

Fig. 2 is a fragmentary view of Fig. 1 showing the same rope but in tensed condition.

Fig. 3 is a view, partly in section, of a rope end equipped with a self-locking connector for latching the rope for instance, to a vehicle or marine vessel.

Fig. 4 is a fragmentary view, partly in section, of a rope or cable including a fluid duct and electric connections and equipped with a coupling for mechanically and electrically connecting the rope or cable.

Fig. 5 is a fragmentary view of an electric cable according to the invention, and Fig. 6 is an isometric view, partly in section, of a rope according to the invention designed for use as a passenger strap.

Referring first to Figs. 1 and 2 in detail, the rope as exemplified in these figures comprises a core 1 made of rubber, a rubber composition, or a suitable plastic. The core is enveloped or encompassed by a harness generally designated by 2. The rope is secured at each end to a coupling member of suitable design; the coupling members being shown as shackles 3 and 4. Coupling members 3 and 4 may be of conventional design; they may be standard wire rope shackles, ring bolts or the like. Both the core and the harness are secured to the shackles in a manner more fully described hereinafter, but are otherwise independent one from the other. The harness is shown as a meshed weave, the warp and weft elements 5 and 6 crossing each other diagonally. Generally, the harness is woven of metal wires but other suitable weave material may also be used. The wires may be either solid wires or stranded wires as indicated in the insert figure associated with Fig. 1. Meshed weave as described, when subjected to an axial pull load, will become elongated and at the same time experience a radial contraction proportional to its elongation. A comparison of Figs. 1 and 2 which show the rope in relaxed and elongated or tensed condition respectively, illustrates the change in configuration experienced by the individual meshes of the harness as a result of an elongation and also the radial contraction experienced by the harness. Meshed wire harnesses as shown in Figs. 1 and 2 are known as cable grips.

The rubber core when elongated by axial pull also experiences of course, a certain radial contraction as appears from a comparison of Figs. 1 and 2.

The diameter of the harness and the diameter of the rubber core are so correlated that when both the core and the harness are relaxed, the harness envelopes the core with a certain clearance which permits a predetermined elongation of both the core and the harness independently one from the other, and that when the core and the harness are elongated beyond said predetermined elongation the contraction of the harness in relation to the contraction of the core is such that the harness grips the core with a tight grip.

Fig. 2 shows that the harness wires press themselves into the rubber material so that the same swells slightly between the wires, and that an axial movement of the core relative to the harness is effectively precluded. The contraction of the harness in relation to the contraction of the core in response to a given elongation is preferably so selected that the harness comes to a tight grip with the core prior to reaching the maximum elongation which it would obtain if the core were not present.

As already mentioned, the coupling member 3, which is exemplified as a shackle is fixedly secured on one end to core 1 and harness 2 and its other end constitutes a receiving member for coaction with the engaging member of a self-locking coupling. To this end, a ring 7 is swagged in a widened part 8 of the generally cylindrical shackle so that core 1 is tightly and strongly anchored within the shackle. Ring 7 also serves to anchor the harness to the shackle but it is generally desirable further to anchor the harness. For this purpose, a ring 9 is force fitted in a narrower part 10 of the shackle.

The receiving member proper is constituted by the outer end of the shackle which for this purpose is formed with a cylindrical part 11 joined to shackle part 10 by a wall portion 12 forming an abutment.

The engaging coupling member is shown in Fig. 3. It comprises a clamping rod 13 having on one end a one-sidedly enlarged clamping head 14 joined to the clamping rod proper by a wall portion 15 slanted similarly to wall portion 12. The other end of the clamping rod ends in an eyelet 16, hook or other component suitable for attaching the rope to the vehicle or vessel to be towed or towing. Clamping rod 13 is slidably fitted in an actuating sleeve 17 the respective end of which is seated on shackle part 11 when the coupling members are latched to each other. Rod 13 is formed with an axial groove 18 in which is held captive a wedging slide 19 and a coil spring 20. A pin 21 retains the slide in the groove against the action of spring 20. Sleeve 17 is preferably provided with a grip such as a knurled or milled collar 22 to facilitate withdrawal of the wedging slide relative to clamping rod 13 for the purpose of releasing the engaging coupling member.

The inner diameter of shackle part 11 fits substantially the combined outer peripheral outline of the wedging slide and the clamping rod just below clamping head 14 and also the peripheral outline of the clamping head. The axial depth of shackle part 11 from its upper edge to wall portion 12 is slightly less than the axial length of side wall 23 of clamping head 14.

The engaging coupling member is applied to the receiving coupling member by first fitting clamping head 14 into shackle part 11. When the clamping head has penetrated the receiving opening formed by shackle part 11 to a certain extent, wedging slide 19 is pushed back together with sleeve 17 against the action of spring 20 by engagement of the slide nose with the rim of shackle part 11. As soon as the clamping head has completely penetrated shackle part 11, it moves into the position of Fig. 3 in which space is made available for the wedging slide also to enter shackle part 11 and to occupy the position along the clamping rod shown in Fig. 3 thereby retaining the clamping head within the shackle. To release the engaging coupling member, sleeve 17 is pulled back, that is, toward eyelet 16 thereby withdrawing the wedging slide from shackle part 11 to permit removal of the clamping head.

Self-locking couplings of the type generally herein referred to are known as "Interlock" couplings and are more fully described in my prior Patents 2,464,543 and 2,674,774 and my copending patent application Ser. No. 161,138, filed May 10, 1950, now U. S. Patent 2,730,687, dated January 10, 1956.

Coupling member 4 is shown as being designed in the same manner as coupling member 3 but as is apparent, the coupling member 4 may also be designed in a manner different from that of member 3. It is only essential that core 1 and harness 2 are anchored to coupling member 4. Except for the coupling members there is no permanent connection between core 1 and harness 2.

In some cases, it is advantageous to sheathe the core and the harness with an axially stretchable hose 25 made for instance, of rubber, a rubber composition or a suitable plastic. This hose is anchored to the shackles by any suitable means. As shown, it is held by ring 7. The hose preferably fits the rope proper with a rather tight fit as is manifested by the wires of the harness being pressed slightly into the material of the hose. The hose serves to protect the exposed wire strands of the harness and also to protect the user of the rope against injury by a broken harness wire. The hose may further be used to retain lubricating material such as graphite inserted between the harness, the core and the hose to reduce friction of these components which move axially relative to each other when the rope is tensioned. The graphite should, of course, be applied when the rope is in the relaxed condition of Fig. 1.

The rope may be produced as a unit, for instance, by extruding the core and the hose, if such is used, over the wire harness.

The rope either in its exemplified forms or in its extruded construction may be manufactured in continuous lengths thereby greatly facilitating the manufacture and reducing the manufacturing costs.

The function of the tow rope as hereinbefore described is as follows:

Let it be assumed that the rope is hooked up to a towing vehicle or vessel and a towed vehicle or vessel and that a towing operation is started. When the load is gradually taken up, both the rubber core and the harness experience a certain elongation and also a certain radial contraction, the initial relative diameter of the core and the harness being such that the core can freely stretch within the harness so that initially the load is taken up by the rubber core only. As the elongation of both the core and the harness progress in response to the increasing take-up of the load, the harness begins to share in the take-up of the load. As previously stated, the relative radial contraction of the core and the harness is such that the harness begins to grip the core when both, the core and the harness have reached a definite elongation, or in other words, when the axial pull load has reached a predetermined value. This value is so selected that a further elongation of the rope in response to an increasing axial pull load—which increase may either be due to a steady pull load or to a jerk—would be dangerous to the rubber material. As is indicated in Fig. 2 by the swelling of the core, the grip of the rubber material by the harness is a very tight one. The result is that an axial pull load acting upon the rope which is greater than the safe limits of the rubber material, is substantially converted into an axial compresison load. In other words, an increase of the axial pull load cannot result in a further and harmful elongation of the rubber core, but causes merely a tighter grip by the harness thereby limiting the possible elongation of the rubber core to a safe value and converting an excessive axial pull load into a radial compression load which can be safely sustained by the core material.

Fig. 4 shows a rope or cable design employing the same principle as previously described, that is, the elongation of the core is limited to a safe value, the pull load is taken up first by the core only, then by the core and the harness jointly and is finally converted in an axial compresison load by the gripping engagement between the core and the harness.

While the rope according to Figs. 1, 2 and 3 is specifically designed as a tow rope, the rope or cable design according to Fig. 4 is a multiple purpose design. It may be used as a tow rope between two vehicles or marine vessels and additionally to establish fluid and electrical connections between the vehicles or vessels for instance, to control the electrical equipment and/or the fluid operated equipment on one vehicle or vessel from the other one. Further, the design of Fig. 4 may be used as a cable to establish fluid and/or electrical connections. It is especially suitable when the cable is subjected to rough operational conditions as they occur in the fields of application previously referred to.

According to Fig. 4, the stranded wires 5 and 6 are replaced by insulated electric conductors 5' and 6', preferably in form of stranded conductors. These wires are woven in form of a meshed weave to form a so-called cable grip. The rubber core 1 may have a simple axial bore to form an air duct, or as shown a spiral wound metal conduit 30 may be fitted in the rubber core. This conduit also serves as reinforcement of the core. The construction of it must, of course, be such that it is capable of participating in the elongation of core 1. The rope mounts at each end a coupling member generally designated by 31. This coupling member serves to secure the rope to a coupling member generally designated by 32 and secured to a tow bar or trailer chassis 33 or to any other appropriate part. As is evident, coupling members 31 and 32 must be designed not only mechanically to hook up the rope but also to establish the air connections and the electric connections with the vessel or vehicle on which coupling member 32 is mounted. Various designs suitable for this purpose may be easily visualized. There is shown as hose coupling a rubber terminal 35 for air duct 30 which is engageable by a conical terminal 36 on coupling member 32. Terminal 35 is continued in an air duct 36' such as a rubber hose.

The electric connections are established by pole elements 37 of coupling member 31 engageable with socket sleeves 38 on coupling member 32. Pole elements 37 are connected to wires 5' and 6'. Similarly, socket sleeves 38 are connected to wires 39 and 40.

Obviously, the arrangement of the male and female contact elements and of the hose terminals may be reversed.

Connector member 31 comprises a coupling shell 45 in which there are anchored the harness formed by wires 5' and 6', core 1 and hose 25 by means of swagged ring 7. The end of core 1 may be mushroom shaped to assure a safe anchorage. Pole elements 37 are mounted in an insulation plate 46 which is secured within shell 45 by any suitable means such as a pressure fit. Plate 46 also constitutes a mount for duct terminal 35. The shell is shown as being externally threaded at 45' for attachment to connector member 32. Part of the shell wall is preferably knurled to facilitate screwing of the shell.

Connector member 32 comprises a coupling shell 50 which ends in a flanged portion 50' by means of which the shell is rotatably fitted in a base mount 51 secured by bolts and nuts 52 or other suitable fastening means to part 33. An insulation plate 53 is rotatably fitted in shell 50 by means of a flat spring clip 54. The plate mounts socket sleeves 38 and air duct 36'. The air duct and wires 39 and 40 are rotatably extended through part 33, preferably protected by an insulation grommet 55. Shell 50 is internally threaded at 52'.

As is apparent the mounting of plate 53 rotatable relative to shell 50 and the mounting of shell 50 rotatable relative to base mount 51 permit to insert pole elements 37 in socket sleeves 38 and terminal 35 in terminal 36 and to join the two connector members by screwing together shells 45 and 50. Similarly, the two connector members may be separated by unscrewing shell 45. To secure shells 45 and 50 in position, one or preferably several circumferentially spaced longitudinal notches 65 are provided in one shell, say shell 50, and a safety clip is mounted on the other shell. This clip is shown as comprising a two-arm lever 66 pivoted to a lug 67 extending from shell 45, integral therewith. Lever 66 is biased by a spring 68 into engagement with the notch 65 with which it is placed in juxtaposition. It is released from the engaged notch by depressing the respective lever end.

The operation of the rope or cable according to Fig. 4 is believed to be evident from the previous description of the rope according to Figs. 1 to 3 inclusive. It suffices to state that the limitation of the elongation of the core, as effected by the radial contraction of harness wires 5' and 6' in response to a predetermined elongation of the core and the harness, prevents an undue constriction of the cross-section of the duct and an overstressing of the electric wires. This latter feature makes the design of Fig. 4 highly suitable as an electric cable for use under the most difficult operational conditions.

Fig. 5 shows the design of an electric cable according to the invention which is similar to that of Fig. 4, except that the air duct is omitted. The same reference numerals are employed to designate corresponding parts.

Fig. 6 exemplifies the application of the principle according to the invention to a part such as a passenger strap. As is well known, a passenger strap is subjected or may be subjected to an axial pull load which tends to be rather jerky. Experience shows that the rubber straps frequently used for the purpose are often torn or twisted off. According to Fig. 6, a rope as has been described in connection with Figs. 1, 2 and 3 is secured on one end to a coupling member 60 shown as a base mount which may be visualized as being secured to the ceiling of a car. The other end of the rope ends in a grip shown as a ball 61.

The aforedescribed limitation of the elongation of the core to a predetermined extent which can be safely sustained by the core material prevents effectively a rupture of the strap.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A combination fluid and electrical connector assembly comprising, in combination, a flexible and resilient core, a flexible conduit for receiving a pressurized fluid flow extending through the center of said core, a plurality of woven electrical conductors defining a mesh harness surrounding and in snug fitting contact with the outside surface of said core, a first coupling member concentric with said core, pole elements associated with the ends of said conduit and said electrical conductors mounted within the said first coupling member, a rigid ring integrally secured to said core and harness, said ring being secured within said first coupling member for preventing separation of said core and harness from said first coupling member, a mating coupling member, a connecting pressure conduit carried by said mating coupling member, electrical conductors within said mating coupling for releasably engaging said respective pole elements within said first coupling member, and releasable connector means for securing said first and second mating coupling members together, whereby tensile forces applied to said core are resisted by said conductors acting in compression upon said core and in tension intermediate said first coupling member and the opposite end of said mesh harness.

2. A combination fluid and electrical connector assembly as set forth in claim 1 wherein said first coupling member includes an open front end, and a rear wall defining a central bore, said core and said socket means extending through said bore, the terminal of said core within said first coupling member having an integral mushroom shaped portion of greater diameter than said bore to prevent separation of said core outwardly from said first coupling.

3. A combination fluid and electrical conductor assembly as set forth in claim 2, further comprising a resilient sleeve enveloping the portions of said core and said mesh harness extending through said bore, and wherein said rigid ring encircles said sleeve and substantially fills the interior of said first coupling member between said mushroom shaped portion of said core and said rear wall.

4. A combination fluid and electrical connector assembly as set forth in claim 3, further comprising a dielectric plate adjacent to said open front end of said first coupling member, said conduit and conductor pole elements being confined within said plate in predetermined spaced relationship with each other, and said mushroom shaped portion being disposed intermediate said plate and said ring.

References Cited in the file of this patent

UNITED STATES PATENTS

| 571,539 | Sawyer | Nov. 17, 1896 |
| 1,002,448 | Putnan | Sept. 5, 1911 |
| 1,944,390 | Aceves | Jan. 23, 1934 |
| 2,002,739 | Herkenberg | May 28, 1935 |
| 2,175,389 | Hanff | Oct. 10, 1939 |
| 2,456,015 | Orser | Dec. 14, 1948 |
| 2,530,105 | Wallace, Jr. | Nov. 14, 1950 |
| 2,634,311 | Darling | Apr. 7, 1953 |

FOREIGN PATENTS

| 29,645 | Great Britain | Dec. 31, 1904 |
| 750,824 | France | Aug. 19, 1933 |
| 980,422 | France | May 11, 1951 |